United States Patent [19]

George et al.

[11] Patent Number: 4,519,915

[45] Date of Patent: May 28, 1985

[54] CLARIFICATION OF BLACK WATER PRODUCED DURING RECOVERY OF BITUMENS AND HEAVY OILS

[75] Inventors: Albert E. George, Kanata; Marc-Andre Poirier, Ottawa, both of Canada

[73] Assignee: Her Majesty the Queen in right of Canada, as represented by the Minister of Energy, Mines and Resources, Ottawa, Canada

[21] Appl. No.: 620,676

[22] Filed: Jun. 14, 1984

[30] Foreign Application Priority Data

Aug. 5, 1983 [CA] Canada ................................ 433992

[51] Int. Cl.$^3$ ................................................. C02F 1/28
[52] U.S. Cl. ..................................... 210/663; 210/691; 210/708; 210/917
[58] Field of Search ............... 210/663, 691, 708, 714, 210/917; 208/8, 11 R

[56] References Cited

U.S. PATENT DOCUMENTS

| 4,133,742 | 1/1979 | Hill | 210/691 X |
| 4,277,346 | 7/1981 | Sakotani et al. | 210/691 |
| 4,392,944 | 7/1983 | Kessick | 210/708 X |

FOREIGN PATENT DOCUMENTS 144254  11/1979  Fed. Rep. of Germany ...... 210/917

*Primary Examiner*—Thomas Wyse
*Attorney, Agent, or Firm*—Fisher, Christen & Sabol

[57] ABSTRACT

Hot water is an important component in the recovery or extraction of bitumen and heavy oils. This hot water tends to form emulsions with the oil and when these emulsions are broken by demulsifiers and the oil separates, the remaining water retains a black color and cannot be recycled in the process. The black color has been most difficult to remove, but it has now been found that it can quite easily be removed by certain selected adsorbents. These include high ash coal rejects, fly ash from coking gas and red mud.

4 Claims, No Drawings

CLARIFICATION OF BLACK WATER PRODUCED DURING RECOVERY OF BITUMENS AND HEAVY OILS

This invention relates to a process for the clarification of black water produced during the recovery or extraction of bitumen or heavy oil.

Vast reserves of bitumen and heavy oils are to be found in Western Canada and hot water is an important component in the recovery or extraction of these materials. The hot water tends to form emulsions with the oil and when these emulsions are broken by demulsifiers and the oil separated, the remaining water retains a black color and cannot be recycled in the process. Furthermore, this black water is not considered to be an environmentally safe material for disposal.

Attempts to clarify this black water have not been successful in the past. For instance, filtering, extraction and centrifuging techniques have been attempted. Canadian Pat. No. 878,656 describes the use of petroleum coke for removing oil from processing water but petroleum coke has not been found to be successful in clarifying this black water. Canadian Pat. No. 979,819 describes the use of bituminous coal, lignite coal or brown coal for clarifying waste waters, but again these materials have not been found to be useful for clarifying the black water. Canadian Pat. No. 706,714 describes the use of fly ash from bark, pine cones and pine needles for removing color bodies from a fluid and that patent indicated that coal fly ash was not a suitable material for removing color bodies. Another material that was tried without success was active carbon, which left very turbid water.

It is the object of the present invention to find an inexpensive adsorbent for the coloring matter found in the black water.

In accordance with the present invention it has surprisingly been found that the black water can be clarified by contacting it with a variety of high ash materials or red mud. The high ash materials include high ash coal, high ash coal rejects and fly ash from coking gas. The red mud, high ash coal rejects and fly ash from coking gas were found to be the most effective materials and they functioned best in the form of a fine dust or powder. Typically, the particle sizes are less than 100 mesh (Canada Standard Sieve).

Red mud is a residue which occurs when bauxite is dissolved in caustic soda at high temperatures to produce alumina as a raw material for the electrolyte production of aluminum. The red mud in dry form has a quite large surface area and its composition varies quite widely depending on the type of bauxite from which it originates.

The effectiveness of these particular materials was clearly not expected, particularly in view of the poor results obtained with coal fly ash in Canadian Pat. No. 706,714.

One method of contacting the adsorbent with the black water is to retain the adsorbent as a filter bed in an extraction column. The black water is then flowed through the column in an upward or downward direction.

The black water is contacted with the adsorbent until the water is colorless. Depending on the contact time required, a plurality of columns may be arranged in series as a continuous flow system or a batch quantity of black water may be recycled through a column or columns until the water is colorless.

The preferred adsorbents according to this invention are all very cheap materials and are, in fact, largely industrial waste materials. As a consequence, when they are no longer effective as black water adsorbents, they can be dumped as waste material.

This invention can more easily be understood from a study of the following examples.

EXAMPLE 1

A. Black Water Samples

Three black water samples were obtained for this investigation, water Sample A being obtained from in situ recovery of bitumen, water Sample B being obtained from in situ recovery of heavy oil and water Sample C being a formation water sample from the field operation of Texas Gulf, at North Battleford, Saskatchewan.

B. Sorbent Materials

Five different useful sorbent materials were Minto coal rejects, Minto coal, Lignite ash and Great Canadian Oil Sands fly ash and red mud. Analyses of several of these in air dried weight percentages are given below:

TABLE 1

| Analysis of Minto Coal Rejects | |
|---|---|
| Proximate analysis | |
| Moisture | 1.26 |
| Ash | 61.19 |
| Volatile Matter | 19.15 |
| Fixed carbon (by diff.) | 18.40 |
| Ultimate analysis | |
| Carbon | 23.32 |
| Hydrogen | 1.57 |
| Sulphur | 12.08 |
| Nitrogen | 0.29 |
| Ash | 61.19 |
| Oxygen (by diff.) | 1.55 |

TABLE 2

| Analysis of Fly Ash Sample | |
|---|---|
| $SiO_2$ | 31.35 |
| $Al_2O_3$ | 17.08 |
| $Fe_2O_3$ | 5.35 |
| $MnO_2$ | 0.08 |
| $TiO_2$ | 5.80 |
| $P_2O_5$ | 0.14 |
| $CaO$ | 1.02 |
| $MgO$ | 0.89 |
| $SO_3$ | 0.78 |
| $Na_2O$ | 0.37 |
| $K_2O$ | 1.25 |
| $NiO$ | 0.92 |
| $V_2O_5$ | 3.08 |
| $MoO_3$ | 0.07 |
| Loss on ignition | 31.82 |

TABLE 3

| Analysis of Red Mud Sample | |
|---|---|
| $Al_2O_3$ | 10.68* |
| $Na_2O$ | 6.80 |
| $CaO$ | 11.49 |
| $SiO_2$ | 8.94 |
| $Fe_2O_3$ | about 30 |

*Total $Al_2O_3$ is 22.7% - the 10.68% together with other less soluble aluminas.

TABLE 4

| Analysis of Lignite Ash | |
| --- | --- |
| $SiO_2$ | 61.27 |
| $Al_2O_3$ | 21.97 |
| $Fe_2O_3$ | 6.06 |
| $TiO_2$ | 0.73 |
| $P_2O_5$ | 0.03 |
| CaO | 0.56 |
| MgO | 2.01 |
| $SO_3$ | 0.57 |
| $Na_2O$ | 0.49 |
| $K_2O$ | 3.76 |

C. Clarification of Black Water

The different sorbent materials were tested using a continuous flow recycling system. This system consisted of a 25 ml separatory funnel that delivered water to a laboratory pump at a flow of 4.2 ml/min through a stainless steel tubing. This water was pumped upwardly through a stainless steel column 30 cm long and 0.6 cm in diameter packed with 5 grams of solid sorbent. The water effluent from the column was recycled to the separatory funnel unil it became colourless.

The capacities of the effective sorbents for removing colored material from black water is set out in Table 5 below.

TABLE 5

Capacity of the Effective Sorbents for Removing Coloured Material from Black Water

| Sorbent | Black Water Sample | Sorbent Weight (g) | Black Water Volume (ML) | Water Colour |
| --- | --- | --- | --- | --- |
| Minto coal rejects | A | 1 | 8 | colourless |
| GCOS fly ash | A | 1 | 5 | colourless |
| Minto coal rejects | B | 1 | 60 | colourless |
| Minto coal rejects | C | 1 | 20 | colourless |
| GCOS fly ash | C | 1 | 50 | colourless |
| Lignite ash | A | 1 | 1 | colourless |
| Minto coal | A | 1 | 1 | colourless |
| Red mud | C | 1 | 75 | colourless |

From the above results, it will be seen that the Minto coal rejects, GCOS fly ash and red mud are quite surprising in their exceptional ability to adsorb colored matter.

EXAMPLE 2

For comparative purposes, various other potentially useful sorbent materials were tested using the same technique as in Example 1. Materials tested in this manner included lignite coal from Poplar River, Saskatchewan, Athabasca bitumen coke, peat from Springfield, Mass., Saskatchewan ball clay #2, high volatile bituminous coal from Nova Scotia, subbituminous coal from Alberta, semi-anthracite coal from Alberta, low volatile bituminous coal, alumina and silica gel. None of these materials was found to be effective for removing the colored material from black water.

We claim:

1. In a process for the recovery or extraction of bituminous or heavy oil wherein emulsions of oil and water are formed and these emulsions are broken leaving a black water, the improvement which comprises clarifying the black water by contacting it with a particulate clarifying agent selected from high ash coal, high ash coal rejects, lignite ash, fly ash from coking gas and red mud.

2. The process of claim 1 wherein the clarifying agent is high ash coal rejects, fly ash from coking gas or red mud.

3. The process of claim 2 wherein the clarifying agent is in the form of a fine dust or powder.

4. The process of claim 1, 2 or 3 wherein the particulate clarifying agent forms a filter bed in an extraction column.

* * * * *